United States Patent [19]

Ferro

[11] Patent Number: 4,660,315
[45] Date of Patent: Apr. 28, 1987

[54] SPEAR GUN HAVING AIR VALVE FORMED BY INNER AND OUTER BARREL

[76] Inventor: Daniel Ferro, 38 Ridgeway Dr., Warren, R.I. 02885

[21] Appl. No.: 875,188

[22] Filed: Jun. 17, 1986

[51] Int. Cl.$^4$ ............................................. A01K 81/04
[52] U.S. Cl. .................................................... 43/6
[58] Field of Search .................... 43/5, 6; 42/1.14; 102/371; 124/57, 60, 71, 73, 75, 76

[56] References Cited

U.S. PATENT DOCUMENTS

| 2,964,031 | 12/1930 | Dotson | 43/6 |
| 3,369,609 | 2/1968 | Fogelgren | 124/57 |
| 3,484,665 | 12/1969 | Mountjoy et al. | 42/1.14 |
| 3,525,319 | 8/1970 | Waldeisen | 124/76 |
| 3,580,172 | 5/1971 | Hendricks | 43/6 |

Primary Examiner—M. Jordan
Attorney, Agent, or Firm—Robert J. Doherty

[57] ABSTRACT

A spear gun preferably operated from the low pressure gas outlet of a diver's air tank. The gun includes a first barrel over which a second barrel is slidably mounted. A gas inlet is mounted on the second barrel which in turn is normally forwardly positioned in a first non-firing position. Retraction of the second barrel acts as a slide valve to permit gas to enter the first barrel and force an arrow, etc. outwardly therefrom.

10 Claims, 8 Drawing Figures

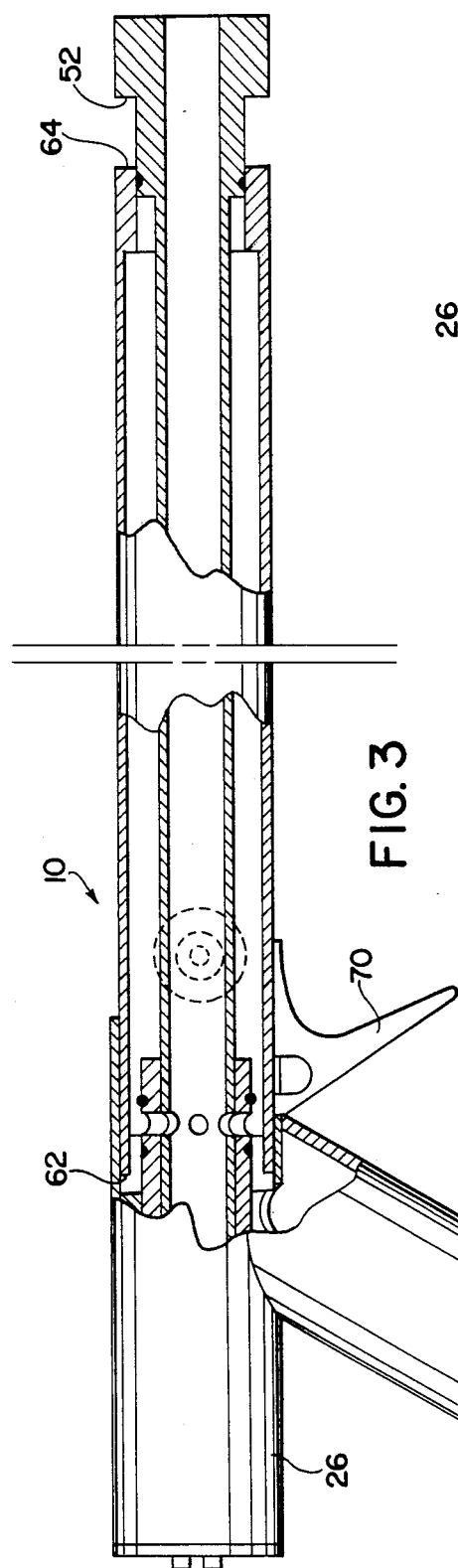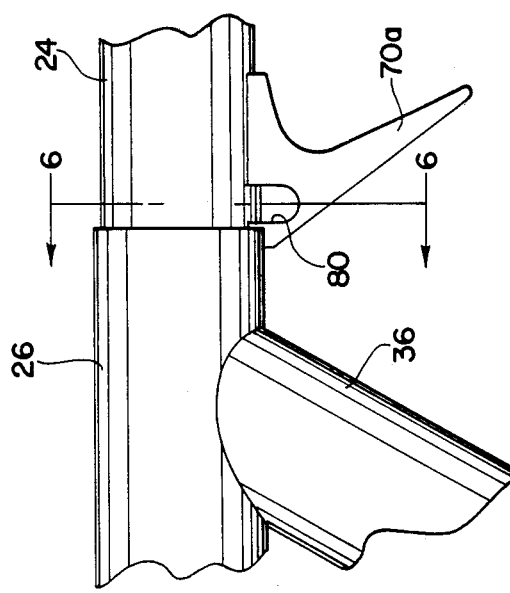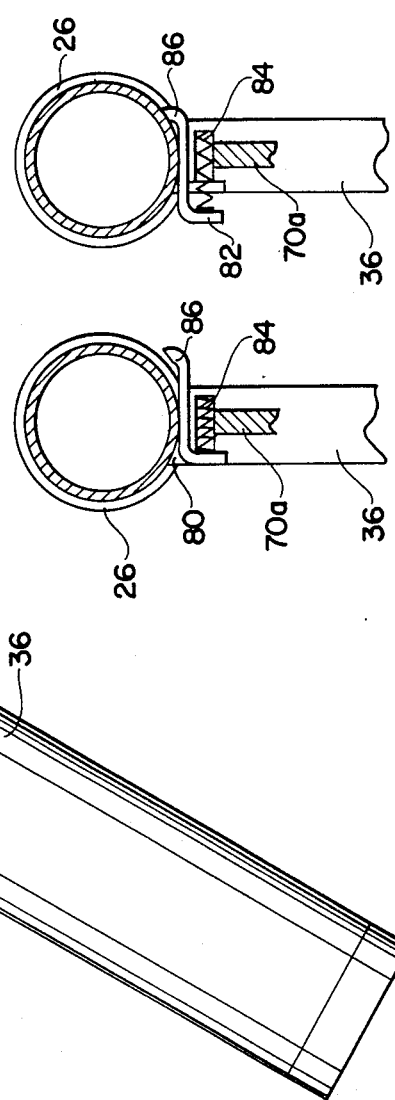

SPEAR GUN HAVING AIR VALVE FORMED BY INNER AND OUTER BARREL

BACKGROUND AND OBJECTS OF THE INVENTION

This invention relates to a gas pressurized and gas activated spear gun for use by scuba divers and others working or otherwise operating in and under water. Known construction spear guns of this type normally operate either on the recoil from a spring or from their own source of compressed air such as a $CO_2$ cartridge. Since scuba divers and others working in the water carry their own source of compressed air for breathing, it would be convenient and would enable a reduction in the weight of gear necessarily carried for a spear gun of this general type to operate directly from such source of compressed air, i.e., a low pressure tap thereof.

A primary object of the invention of the invention is to present a gas-operated spear gun of the type used by those having a need to carry a compressed air supply such as scuba divers and the like which is of simple yet dependable construction and which may be produced at a moderate cost.

A further object of the present invention is a gas-operated spear gun of the above-indicated type which operates from a low pressure tap of a gas tank and which is free of the normally complex structure found in spear guns presently available.

These and other objects of the present invention are accomplished by a compressed gas-actuated spear gun for scuba divers and the like which carries a supply of compressed gas comprising, a handle assembly including an open face, closed end receptor tube from which a handle downwardly projects, an inner barrel assembly including a longitudinal first hollow barrel having an interior chamber and an open front end for receipt of an arrow, spear or other projectile and a closed rear end in turn including means for fixedly attaching said first barrel to said receptor tube, an outer barrel assembly including a second longitudinal hollow barrel open at both the front and rear ends thereof through which at least a portion of said first barrel projects, said second barrel disposed between the front end of said first barrel and said receptor tube wherein the rear end thereof partially projects into the open forward end of said receptor tube, valve means cooperatively formed by said inner and outer barrel assemblies including a compressed gas inlet mounted on said second barrel, said second barrel further retractable between a normal first forward position and a second rearward firing position wherein compressed gas is directed into said first barrel behind said projectile so as to force it out the open front end of said first barrel.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 3 is a partial side sectional elevational view similar to FIG. 2 but showing the gun in its firing position;

FIG. 5 is a side elevational view showing a portion of the trigger housing of a modified form of the device supplied with a safety;

FIG. 6 is a sectional view taken along the line 6—6 of FIG. 5 showing the safety in a locked position; and FIG. 7 is a sectional view corresponding to FIG. 6 but showing the safety in the unlocked potential firing position.

DETAILED DESCRIPTION OF THE INVENTION

Figure 1:
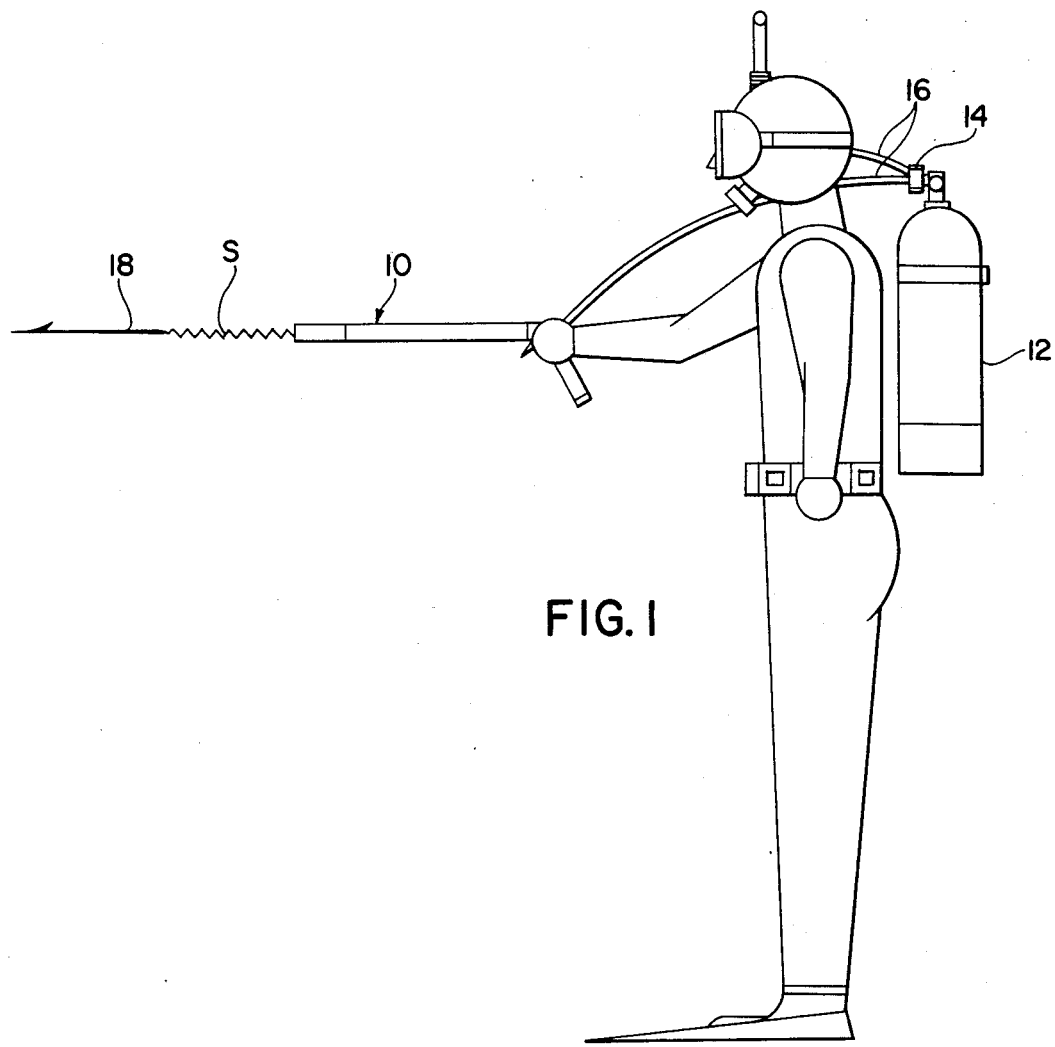
FIG. 1 is a stylized view of a scuba diver utilizing the spear gun of the present invention.
Figure 2A:
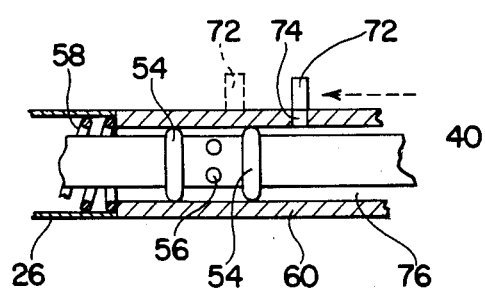
FIG. 2A is a somewhat stylized sectional view of a portion of FIG. 2.
Figure 2:
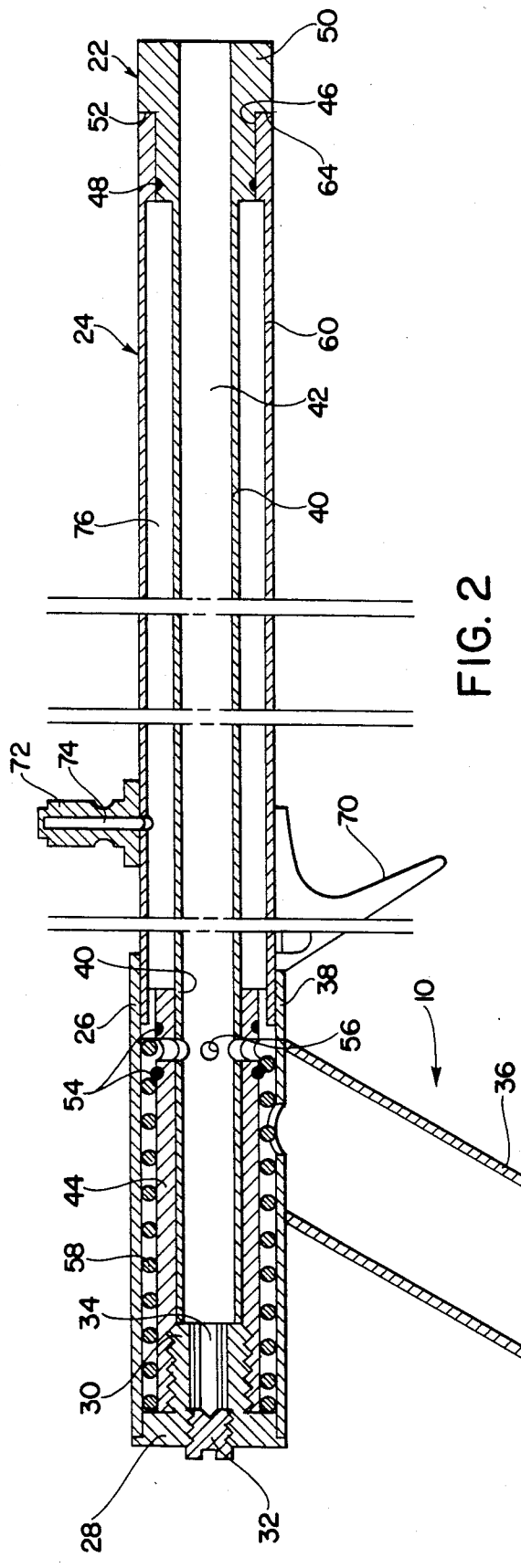
FIG. 2 is side sectional elevational view of the gun on an enlarged scale in a rest or non-firing position.
Figure 4:
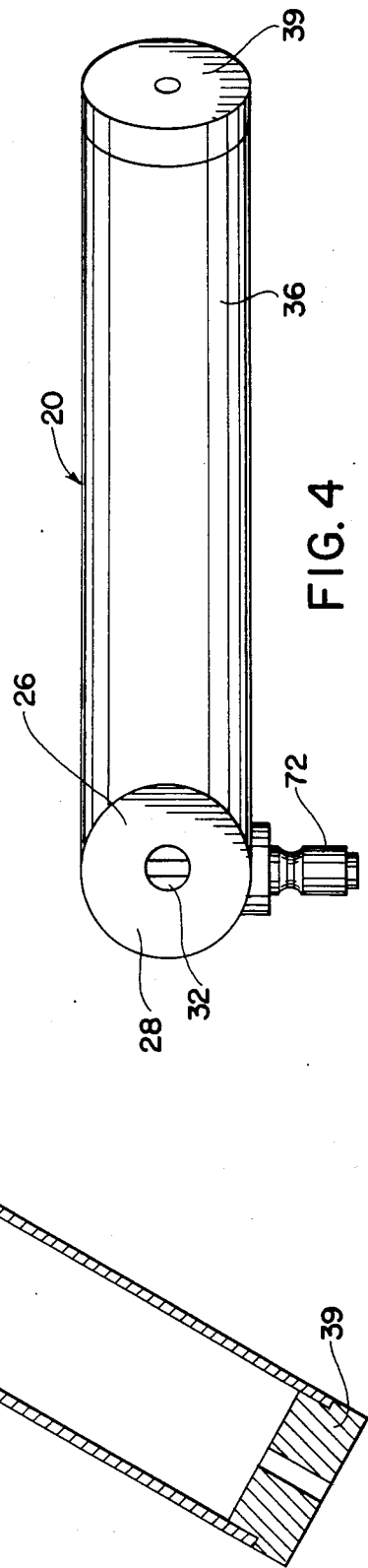
FIG. 4 is a rear elevational view thereof.

The spear gun 10 of the present invention is shown in FIG. 1 being utilized by a scuba diver having his/her own supply of compressed gas in the form of a tank 12. Having a pressure reducer 14 and two low pressure taps or outlets 16 one of which is connected to the gun 10 as hereinafter will be more fully explained to supply the propellant force for the spear 18 depicted being fired therefrom. The overall construction of the gun 10 is best shown in FIGS. 2 through 4 wherein the major component parts include a handle assembly 20, an inner barrel assembly 22, and an outer barrel assembly 24.

The handle assembly 20 includes a hollow cylindrical receptor tube 26 open at its front end for receipt of both the inner and outer barrel assemblies 22 and 24 and closed at its base end by an end cap 28 welded or otherwise fixed thereto and including an upstanding threaded boss 30. The end cap 28 includes a central plug 32 which leads to a bore 34 through the boss 30 for storage of a string S which in turn is connected to the spear 18. A hollow handle 36 downwardly extends from the receptor tube 26. Accordingly, the overall configuration of the handle assembly 20 is somewhat T shaped. In addition, the receptor tube 26 includes a rearwardly extending notch 38 of somewhat U-shaped configuration. The handle includes a plug 39 with an opening such that water can be forced therethrough to purge the inner barrel 40 when the spear is loaded under water.

The inner barrel assembly 22 includes a first barrel 40 having a smooth bore 42 and of longitudinal extent so as to accept an arrow, spear, or other projectile disposed therein. The rear end of the first barrel 40 terminates in an enlarged cylindrical extension 44 which is internally threaded so as to be threadably received on the boss 30 so as to connect the inner barrel assembly 40 to the handle assembly 20. The front end of the first barrel 40 terminates in an enlarged cylindrical extension 46 provided with a sealing ring 48 and further terminating at its forward end in an enlarged head 50 so as to present a shoulder or stop 52 proximal thereto. The lower cylindrical extension 44 of the first barrel 40 includes a pair of sealing rings 54 seated in grooves cut into the extension and between which gas entry means in the form of a plurality of radial openings or ports 56 is formed. The openings 56 enable compressed gas to enter the bore 42 and to propel the projectile placed therein as will hereinafter be more fully explained. The projectile, i.e., an arrow or spear 18, extends into the first barrel about two thirds of the extent of the barrel, that is, forwardly of the gas ports 56 and is held therein by positioning rings on the base of the spear.

A coil spring 58 is disposed in the receptor tube 26 and is supported by the cylindrical extension 44. The second barrel assembly 24 is adapted to be supported on the first barrel assembly which projects therethrough between the receptor tube 26 and the shoulder 52 of the enlarged head 50. The second barrel assembly 24 includes a second barrel 60 of an internal diameter approximating the external diameter of the cylindrical extension 44 and of a longitudinal extent such that its rear end 62 extends slightly into the open front face of the receptor tube 26 and its forward end 64 abuts the shoulder or stop 52. In assembly, the first barrel 40 is pushed though the open front end of the second barrel 60 and thereafter the enlarged head 50 rotated so as to threadably connect the extension 44 to the boss 30. The enlarged head 50 may be knurled for this purpose.

The spring 58 as shown in FIG. 4 forwardly urges the second barrel 60 into engagement with the shoulder or stop 52. In this position, however, the second barrel 60 may be retracted into the receptor tube 26 against the action of the spring 58. In this regard, it should also be pointed out that a trigger 70 downwardly extends from the bottom of the second barrel 60 proximal the rear end thereof and that such rearward motion of the second barrel 60 into the receptor tube 26 is permitted by the rearwardly extending notch 38. In effect then the gun 10 may be conveniently held in one's hand by grasping the handle 36 in the palm of one's hand and using one's forefinger to grasp the trigger 70 so as to retract a portion of it and the second barrel 60 rearwardly into the receptor tube 26.

An air or compressed gas inlet 72 is mounted on the outside wall of the second barrel 60 and is adapted for connection with the low pressure tap or line 16 of the tank 12. The connector 72 includes a central passageway 74 which extends into an interior chamber 76 between the inside of the second barrel 60 and the outside of the first barrel 40. Compressed gas, air or the like forced into such chamber when the connection is made to the low pressure tap 16 is retained within such chamber by means of the seal 48 and the forwardly disposed seal 54. However when the second barrel 60 is retracted by the aforementioned rearward motion on the trigger 70, the second barrel 60 moves into the receptor tube 26 and is dimensioned such that the forward end originally in sealing contact with the forward ring 54 slides over such ring seal and enables the chamber 76 to directly communicate with the radial openings 56. In other words, the retraction of the barrel 60 permits the chamber 76 to come into direct communication with the first barrel bore 42 and thus propel the missile disposed therein outwardly of the forward end of the first barrel. Additionally, the rear end of the barrel 60 slides into communication with the rear seal 54 as such action is accomplished and thus prevents the gas from being forced into the lower portions of the receptor tube 26. Gas is also prevented in both positions of the gun shown in FIGS. 2 and 3 from being forced out the forward portion by the seal 48. In effect then, the second barrel assembly 24 acts as a slide valve such that in its forward position the missile or spear 18 cannot be activated but when retracted enables compressed gas from the connector 72 to reach the inner bore 42 of the first barrel 40 behind the missile and thus force it outwardly through the forward open end thereof. This above-described action is in part illustrated by FIG. 2A where the movement of the second barrel 60 towards the rear (direction of the dotted arrow) places air or gas inlet 72 (dotted lines) in such a position to allow gas from chamber 76 to enter the first barrel through ports 56, of course, it may not be necessary to have a chamber 76 depending on tolerances in which case the retraction motion of the barrel 60 would place the gas inlet 72 into communication with the ports 56. Also there need not be a pluraliy of ports 56 so long as gas is allowed to enter the first barrel in the intended manner.

Turning now to FIGS. 5 through 7, a preferred safety lock is shown. Therein the trigger 70a is provided with a cut-out 80 in which a L-shaped slide 82 is mounted. A spring 84 normally urges the slide to the left as shown in FIG. 6 wherein an upwardly extending detent 86 engages the forward edge of the open tube 26 so as to prevent rearward relative movement of the second barrel relative to the receptor tube 26. The trigger 70a is mounted on the second barrel. By forcing the tab to the right and thus forcing the detent 86 out of contact with the receptor tube 26, the trigger 70a may be operated in the normal manner to fire the gun as above explained.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A compressed gas-actuated spear gun for scuba divers and the like which carries a supply of compressed gas comprising, a handle assembly including an open face, a closed end receptor tube from which a handle downwardly projects, an inner barrel assembly including a longitudinal first hollow barrel having an interior chamber and an open front end for receipt of an arrow, spear or other projectile and a closed rear end in turn including means for fixedly attaching said first barrel to said receptor tube, an outer barrel assembly including a second longitudinal hollow barrel open at both the front and rear ends thereof through which at least a portion of said first barrel projects, said second barrel disposed between the front end of said first barrel and said receptor tube wherein the rear end thereof partially projects into the open forward end of said receptor tube, valve means cooperatively formed by said inner and outer barrel assemblies for enabling compressed air to enter said inner chamber including a compressed gas inlet mounted on said second barrel, said second barrel further retractable between a normal first forward position and a second rearward firing position wherein compressed gas is directed into said first barrel behind said projectile so as to force it out the open front end of said first barrel.

2. The gun set forth in claim 1 including means in said receptor tube for continually urging said second barrel to its normal first forward position.

3. The gun set forth in claim 2, including a fixed trigger mounted on said second barrel for urging said barrel to said second firing position.

4. The gun set forth in claim 3, said trigger disposed at a position forward of but proximal to said open face of said receptor tube.

5. The gun set forth in claim 1, said valve means comprising gas inlet means extending through said first barrel into said interior chamber proximal to said first barrel rear end and sealing means disposed on said first barrel forwardly of said first barrel gas inlet means so as to form a gas seal between said first and second barrels in said first position, said second barrel gas inlet positioned thereon such that said second barrel gas inlet overrides said sealing means and permits compressed gas to pass through said first gas inlet means when the second barrel is retracted to its firing position.

6. The gun set forth in claim 5, said first barrel having an enlarged inner cylindrical end adapted for screw engagement with the closed end of said receptor tube, said inner cylindrical end having a plurality of gas inlet openings radially extending therethrough into communication with said interior chamber and a sealing ring disposed forwardly of said inlets.

7. The gun set forth in claim 6, said first barrel having an enlarged outer end forming a forward stop for said second barrel.

8. The gun set forth in claim 3, said urging means being a coil spring disposed in said receptor tube between the closed end hereof and the inner end of said second barrel.

9. The gun set forth in claim 8, including a rearwardly extending cut-out in a forward end of said receptor tube, said trigger longitudinally aligned with said cut-out and adapted to extend thereinto in said second firing position.

10. The gun set forth in claim 9, including a safety lock including a laterally movable tab adapted to move from a position wherein a tab end abuts the forward edge of the receptor tube to prevent the trigger from extending into said slot to a clearance position therewith.

* * * * *